United States Patent [19]

Peers et al.

[11] Patent Number: 4,689,022

[45] Date of Patent: Aug. 25, 1987

[54] SYSTEM FOR CONTROL OF A VIDEO STORAGE MEANS BY A PROGRAMMED PROCESSOR

[75] Inventors: John Peers, 11690 Putter Way, Los Altos, Calif. 94022; Tim K. Scholz, Sunnyvale; Murray Shaw, Mountain View, both of Calif.

[73] Assignee: John Peers, Los Altos, Calif.

[21] Appl. No.: 605,706

[22] Filed: Apr. 30, 1984

[51] Int. Cl.⁴ .................................................. G09B 5/00
[52] U.S. Cl. ....................................................... 434/307
[58] Field of Search ........................................... 434/307

[56] References Cited

U.S. PATENT DOCUMENTS

| | | | |
|---|---|---|---|
| 3,987,484 | 10/1976 | Bosche et al. | 434/307 |
| 4,402,021 | 8/1983 | Sonoda et al. | 360/72.2 |
| 4,403,263 | 9/1983 | Kageyama et al. | 360/32 |
| 4,404,602 | 9/1983 | Hoshimi et al. | 360/13 |
| 4,420,777 | 12/1983 | Furuta | 360/61 |
| 4,459,114 | 7/1984 | Barwick | 434/307 |

OTHER PUBLICATIONS

Barry Mirkin, "Teaching Electronics on Interactive Video", E-ITV Jan. 1984, pp. 43–44.
Elizabeth Bibb, "PC Training Gets Personal", PC Magazine, Apr. 3, 1984, pp. 273, 277.
Promotional literature-Whitney Educational Services "Interactive Video Supercircuit II".

Primary Examiner—Leo P. Picard
Attorney, Agent, or Firm—Fitch, Even, Tabin & Flannery

[57] ABSTRACT

A system for control of a video storage device by a programmed processor. A preferred implementation illustrates a tutorial system including a personal computer as the programmed processor, a video cassette recorder as the video storage device, a video monitor, and an interface and control circuit for communication and control among the system elements. Under control of the personal computer audio, video, and digital data can be read from or written to any location on a video tape of the video cassette recorder. The system uses this capability to store a plurality of video segments and audio segments on the video tape relating to a story board. Additionally stored on the tape is a programmed index in digital form indicating the storyboard sequence of the video segments and their locations on the tape. An interactive teaching program run on the personal computer reads the index and plays the video segments in the story board sequence. The teaching program interacts with a student via prompts and questions and is adapted to change the display sequence of the video segments in response to his answers.

12 Claims, 20 Drawing Figures

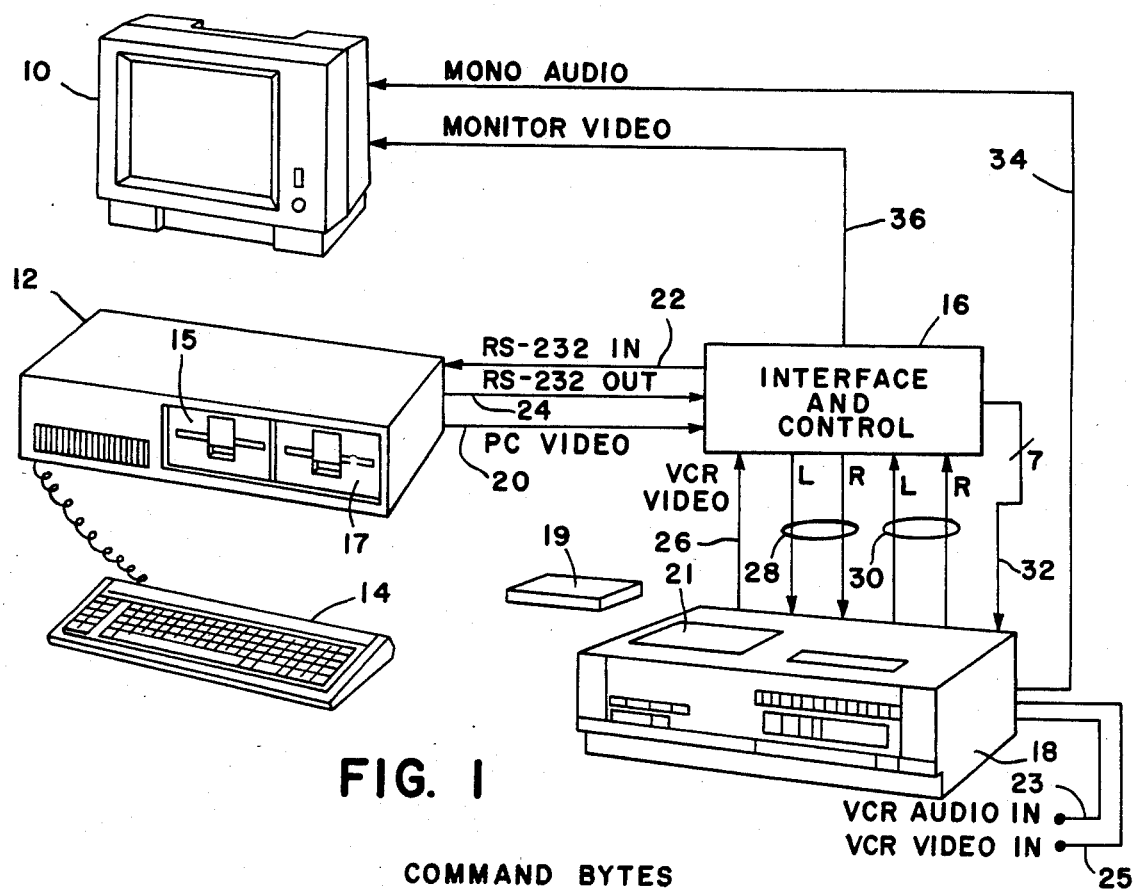
FIG. 1
| BØ | CHAR 1 | CHAR 2 | B7 | FUNCTION |
|----|--------|--------|----|----------|
| O | 1 | X | X | VCR VIDEO |
| O | 2 | X | X | CHAN L/R WRITE |
| O | 3 | X | X | CHAN L/R READ |
| O | 4 | X | X | CON REWIND R (READ) |
| O | 5 | X | X | CON FAST FORWARD R(READ) |
| O | 6 | 0 | X | STOP R(READ)(PC VIDEO) |
| O | 6 | 1 | X | PAUSE R(READ) |
| O | 6 | 2 | X | PLAY |
| O | 6 | 3 | X | REWIND |
| O | 6 | 4 | X | FAST FORWARD |
| O | 6 | 5 | X | RECORD |
| O | 6 | 6 | X | READ R(CFF) R(CR) |
| O | 6 | 7 | X | WRITE |
FIG. 2
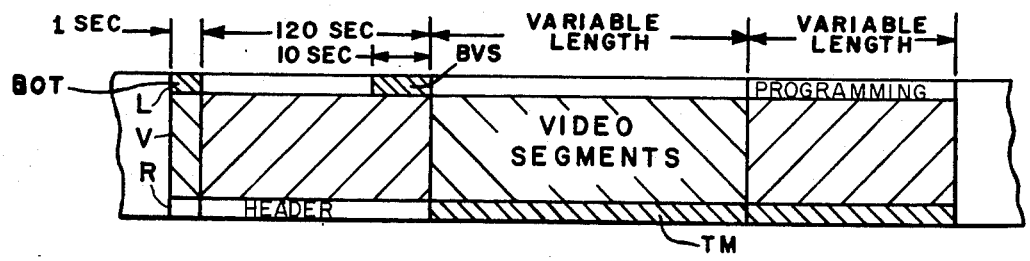
FIG. 3

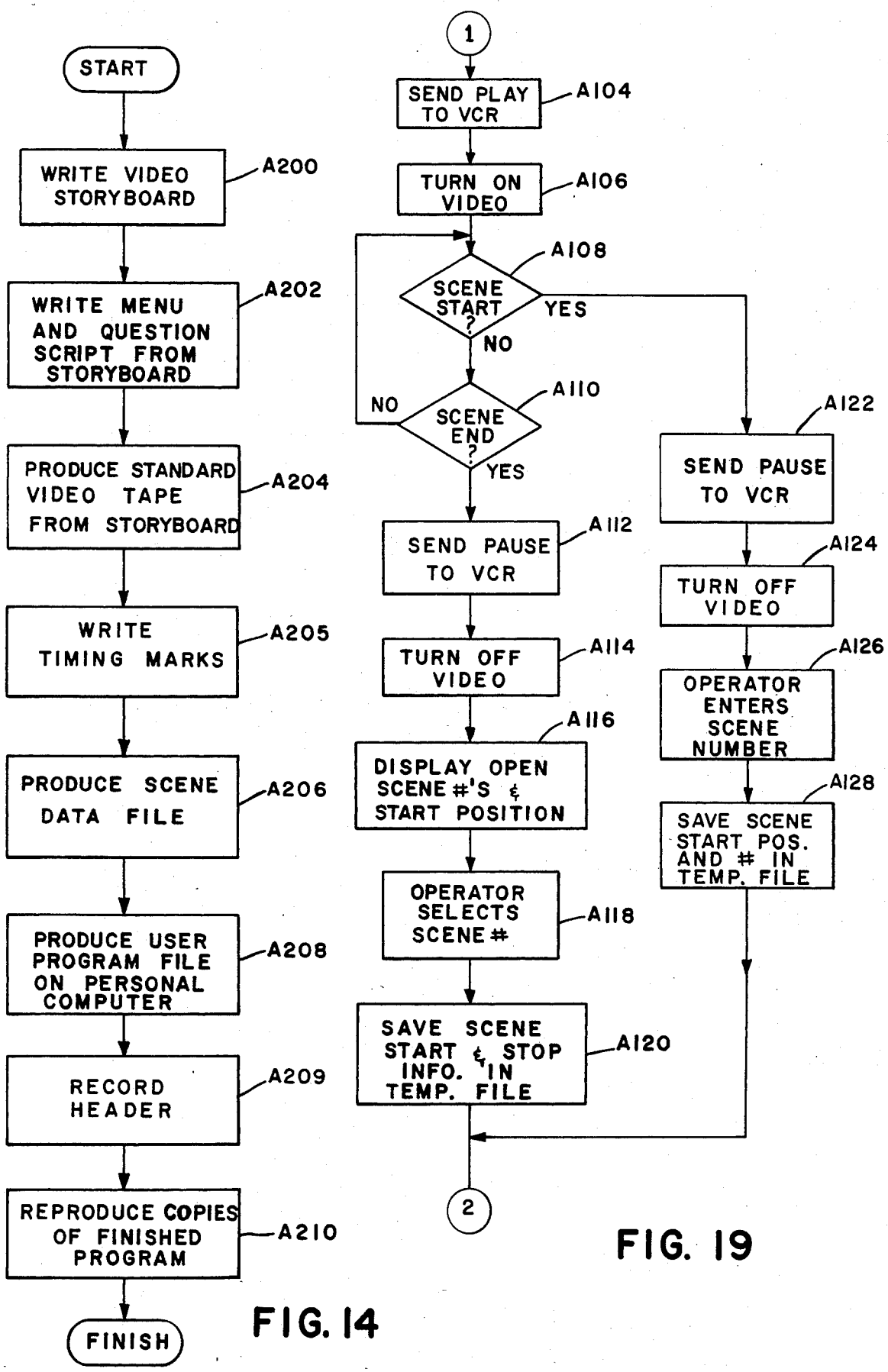

SYSTEM FOR CONTROL OF A VIDEO STORAGE MEANS BY A PROGRAMMED PROCESSOR

The invention relates generally to a system for control of a video storage means by a programmed processor and is more particularly directed to such a system used in a tutorial or learning system including a personal computer, a video monitor, and a video cassette recorder where the video cassette recorder is under the control of the personal computer.

Personal computers are becoming a necessary adjunct to the complex society of the future. The projected number of personal computers which are expected to be put in use in the next few years is an order of magnitude greater than the already numerous machines assisting us today. The growth and acceptance of these devices can only be described as exponential and it is with some surety that before long they will be ubiquitous in our everyday lives.

With this growth in personal computers has come an even greater proliferation of the application software which is used by these machines. Business, financial, amusement and educational software now comes in such a wide variety of choices that it is difficult for one to be familiar with all the new programs that are being made available. One of the things that has been decreasing the use of software by noncomputer educated persons is the lack of teaching available to them.

It is not only whether the program and computer itself is user friendly but also whether the instructions on how to use a certain program are comprehensible. Many programs that could be successfully and easily used by most anyone languish with computer sophisticates because user manuals which purport to teach one how to use them are written in computerese. These user manuals are written in highly technical prose by experts and seek to describe complex actions and responses by the individual while he is interacting with a particular program. The problem is one of comprehending the difficult concepts and jargon while learning the new interaction skills.

It is not only the technical jargon which keeps the operator manuals incomprehensible, but also the medium by which they are communicated. A human learns an action-response sequence much more quickly and, it is believed, more completely by acting through a desired learning sequence or at least by watching someone else do so. From normal teaching experience it is evident that the method of learning to operate a complex software program where machine interaction is required should be more visual and less written.

Moreover, interaction with the machinery invites familiarity where if a person interacts with the system during the learning process of operating a program for the first time, he will feel more comfortable and confident about using the program thereafter. Thus the initial introduction to the program is critical in getting the user to return and make the program an every day tool. This crucial introduction should not be made by the harsh device of a user manual.

What this suggests, of course, is a personal tutor which would provide a visual demonstration of the tasks and operations of the software that should be mastered. More importantly, tutor would provide a method of feedback or interaction allowing a person to ask questions and actually perform the tasks under the watchful eye of a mentor. However, this type of learning, while conceded best, is also time consuming and more costly than can be justified.

Between these two extremes of the best and worst methods of learning to use new programs there are at least two other types of learning methods with their own strengths and drawbacks. The first is the interactive program where a computer attempts to take the role of tutor. The programs may include textual and graphic prompts on a monitor which require an answer and even provide some degree of feedback on the actions of the student in response to a particular criteria. What, however, is missing is the visual teaching dimension so useful in the human learning process where a person is shown by example how to perform a particular task or operation. The communication of information by an interactive program is basically textual and has, to the extent of the language and technical jargon used, the same comprehension problem as a written manual.

Other systems have emphasized the visual part of the teaching equation. The visual dimension in teaching without a live tutor has been popularized by the video cassette tape and video cassette recorder. A live teaching session can be recorded on tape and reproduced by a recorder with a video monitor as a medium of information transfer. The problem with a video tape program is that an interactive role by a student cannot be integrated successfully into these programs.

What is needed is a tutorial system, for software programs and otherwise, which integrates not only the interactive portion of the computerized teaching systems but also the visual dimension of the personal tutorial.

SUMMARY OF THE INVENTION

The invention provides an apparatus for the control of a video storage means by an interactive processor. The video storage means contains a plurality of video data segments which are stored in a random manner. Contained on one part of the video storage means is a programmed index with information as to which video data segments are to be addressed for a particular use and where those segments are located. The system includes a user program that can be executed by the processor means and which is interactive with an operator. The use of the video segments is controlled by reading the index into the processor means and acting on that information with the user program as modified by the operator input.

In a preferred implementation of the invention, the processor means comprises a personal computer with a keyboard input for communication with a student and a serial data interface for communication with the video storage means. Through the serial data interface the personal computer can control a video cassette recorder implementing the video storage means to read and write digital data therefrom. The video cassette recorder further supplies a video signal to a monitor in order to display the video segments recorded on a teaching cassette tape.

The apparatus can advantageously be used as a tutorial system where an interactive teaching program is executed by the personal computer as the user program. The video cassette recorder is loaded with a corresponding teaching cassette having a header containing the index of the plurality of video segments recorded on a subsequent area of the cassette tape.

In a tutorial session the teaching program reads the index portion of the teaching tape and controls the video cassette recorder to display the segments in an order indicated by the index. The program is interactive such that the student may progress at his own speed while having the benefit of a visual instruction format. Since the teaching program is advised of the order of the video segments from the index, it can display them in a normal order as provided by the index or can vary the order depending upon interaction by the student. Thus, a student may review a particular portion of a teaching exercise as needed or may even use supplementary meaterial not used by other students. This type of interaction may be based on his understanding of the previous material and can help immensely in the learning process. Such interactive modification of the video display sequence can also be accomplished by textual prompts from the teaching program or in response to review questions for a particular teaching exercise.

The personal computer communicates with the video cassette recorder via an interface and control circuit which receives VCR control commands and data from the personal computer and reads and writes data to and from the VCR. Additionally, the interface and control circuit is adapted to switch a video monitor from displaying video information from the personal computer to displaying video information from the VCR upon command. In this manner, a tutorial system appears to the student to have only one source for the video scenes stored on the teaching cassette tape and for text and graphic material stored in the teaching program. The system advantageously integrates the interaction of the teaching program and the visual material on the video segments of the teaching cassette tape into one system.

The interface and control circuit advantageously uses at least one communication channel of the personal computer, such as an RS-232 port, to communicate digital data from the computer memory to the VCR or to read digital data from the VCR. The interface additionally receives digital data from the personal computer and decodes such into command words in order to control the physical operation of the VCR.

In a preferred implementation the format for the teaching tape includes digital data stored on the left and right stereo tracks of a high fidelity beta format tape, an audio program stored on the mono audio track of the tape, and a plurality video segments stored normally on the video tracks of the tape.

For a tutorial or teaching tape the header or index is stored on the stereo channels and contains a file of digital data indicating the sequence of a number of video segments N, including the beginning and terminating addresses of each. On the right stereo channel after the header is contained a position number running the length of the video segments that can be read by the personal computer to determine the position of the tape in the VCR at any moment. The video and audio tracks are used to contain the teaching segments which then can be accessed by the user program from knowing the position of the tape and where a particular video segment is located on the tape from the index.

These and other objects, features and aspects of the invention will be more fully understood and better described if a reading of the following detailed description is undertaken in conjunction with the appended drawings wherein:

BRIEF DESCRIPTION OF THE DRAWINGS

FIG. 1 is a system block diagram of a system for control of a video storage means by a programmed processor constructed in accordance with the invention;

FIG. 2 is a pictorial representation in tabular form relating command character words to their video cassette recorder function for the system illustrated in FIG. 1;

FIG. 3 is a pictorial representation of a format for a teaching tape for the system illustrated in FIG. 1.

FIG. 14 is a system flow chart of an overview of the process of producing a teaching tape in accordance with the invention;

FIGS. 18 and 19 are a detailed flowchart of a routine for producing a header on a video cassette tape as called from the routine illustrated in FIG. 14.

DETAILED DESCRIPTION OF THE PREFERRED EMBODIMENT

Figure 4:
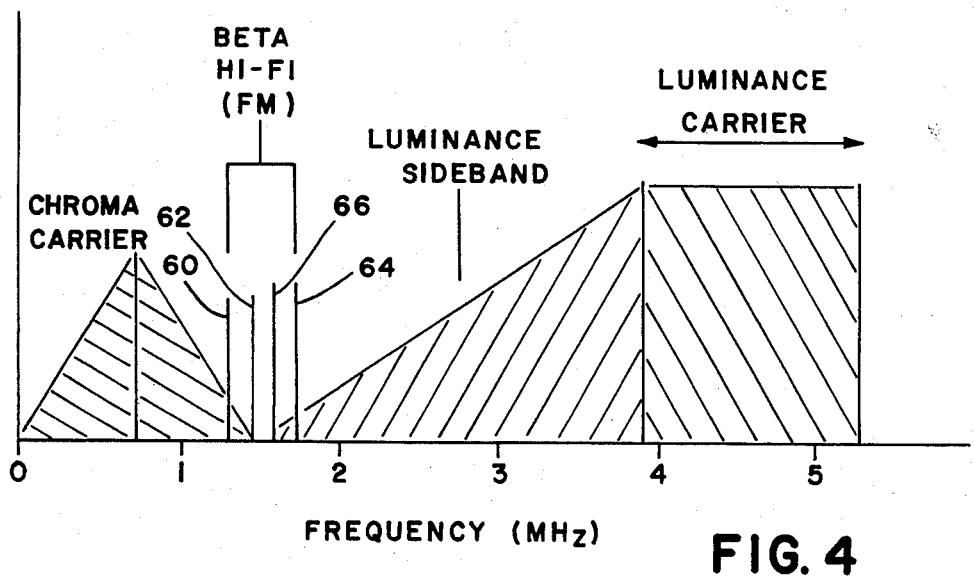
FIG. 4 is a frequency versus amplitude representation of the carrier separation provided for the FM modulation of a stereo video Beta format tape.

FIG. 1 shows a system for the control of a video storage means by a programmed processor which is constructed in accordance with the invention. The video storage means used in the illustrated implementation of the invention is a commercially available video cassette recorder (VCR) (18) and the processor means used is a commercially available personal computer system comprising a video terminal or monitor (10), a processor and disk module (12), and a keyboard (14). An interface and control circuit (16) provides the communication links and control signals between the processor module (12) and the VCR (18) in a manner which will be more fully explained hereinafter.

Generally, the processor module (12) under the supervision of a software program controls the VCR (18) to operate according to its commands. The selected operations include reading or writing digital data from or to any location on a cassette tape (19) placed within a tape receiver (21) of the VCR (18), and recording or displaying video data to or from any location on the tape. The video data from the cassette tape is used alternately with video data from the personal computer to drive the monitor (10).

In the preferred implementation, the personal computer comprises either a model PC or XT manufactured by International Business Machines, Inc., with a video monitor (10) and keyboard (14). The system configuration also includes dual disk drives (15, 17) and provision for system operation under control of a standard disk operating system such as PC/DOS. Preferably, the personal computer (10) is equipped with one or more standard bidirectional serial communication channels (22, 24) which operate under a common serial data protocol, such as RS-232-C. Additionally, the personal computer system should be capable of displaying text and graphics on the video monitor (10) with a composite video signal via PC video line (20).

The processor module 12 communicates with the interface and control circuit (16) via the RS-232 communication channel by a serial data in line (22) and a serial data out line (24). In addition, the video composite signal used for running the monitor (10) is provided to the interface and control circuit (16) via the video signal line (20).

The VCR (18) which is under the control of the processor module 12 can be operated functionally by the interface and control circuit (16) via a seven line control cable (32). Additionally, digital data passed from the processor module 12 to the interface and control circuit (16) and vice versa can be read from and written to the video tape cassette (19) of the VCR (18) through audio stereo channel inputs (28,30). Each audio channel 28,30 has two inputs as will be more fully explained hereinafter.

The VCR video output is transmitted to the interface and control circuit (16) with a video line (26). Depending upon commands given by the processor module (12), the interface and control circuit (16) can select one of the video signals, from either line 20 or line 26, and communicate that signal to the monitor (10) on video line (36). The monitor video line (36) is connected to the video input of the monitor and is used to visually display the signal on the line. An audio line (34) is connected to the audio amplification circuitry of the monitor at one end and at its other end connected to a mono audio output signal from the VCR (18).

In operation, the processor module (12) is adapted to control whether the video display on the monitor (10) is text or graphics from the personal computer or is a visual display from video information stored on the cassette tape (19). Commands are given to the interface and control circuit (16) via the RS-232 communication output line (24) to either switch the personal computer video signal line (20) or the VCR video signal line (26) to the monitor video line (36). Prior to selecting the VCR video line 26 for connection to the monitor video line (36), the operational commands from the processor module (12) will cause the video cassette recorder (18) to position the cassette tape (19) and play such that a particular video segment on the tape will be displayed on the monitor (10) with its corresponding audio track.

In the alternative, operational commands from the processor module (12) via line (24) will position the cassette tape (19) and operate the recording function to record video data, input on line (25), and audio data to input on line (23) at any location on the video cassette tape (19). This operational capability allows the system to record particular video data which can be displayed later by the reproducing operation.

In addition, by controlling the operation of VCR functions such as stop, pause, play, rewind, fast forward and record by commands output on line (24), the processor module (12) can read and write digital data on the video cassette tape (19) of VCR (18). The means for reading and writing digital data are the channel lines (28,30) which in the preferred embodiment comprise the signal inputs and outputs of two audio stereo channels (L,R) of the VCR (18). In this manner the write data channel (28) comprises a signal line for writing digital data to the left stereo channel and a signal line for writing digital data to the right stereo channel. In a similar manner, the read data channel (30) comprises a signal line for reading digital data from the left stereo channel and a signal line for reading digital data from the right stereo channel. Upon command of the processor module 12, digital data is output on signal line (24) and written on either the left or right stereo channel by the interface and control circuit (16) through communication channel (28). Upon command of the processor module (12) digital data is read from the cassette tape (19) of VCR (18) from either the left or right stereo channels via the communication channel (30) and the data input line (22).

By being able to control the positioning of the tape in the VCR via the seven control lines of cable (32), the personal computer can read or write digital information on the aforementioned stereo channels at any position on the tape. Therefore, the cassette tape (19) of the VCR (18) is read and written to similar to that of the memory of the computer. The video cassette recorder (18), however, has a major advantage over a standard computer memory because it also stores visual or video segments which can be shown on the monitor (10). The interface and control circuit (16) allows the personal computer to address the video segments on the tape as it would a memory and enables it to play these segments on the monitor in the sequence, order, and timing commanded by the personal computer. This capability, coupled with the power of the personal computer to be programmed and to provide an interactive communication with a human operator, combines to provide an advantageous system that can be used for multiplicity of unique purposes.

Figure 7:
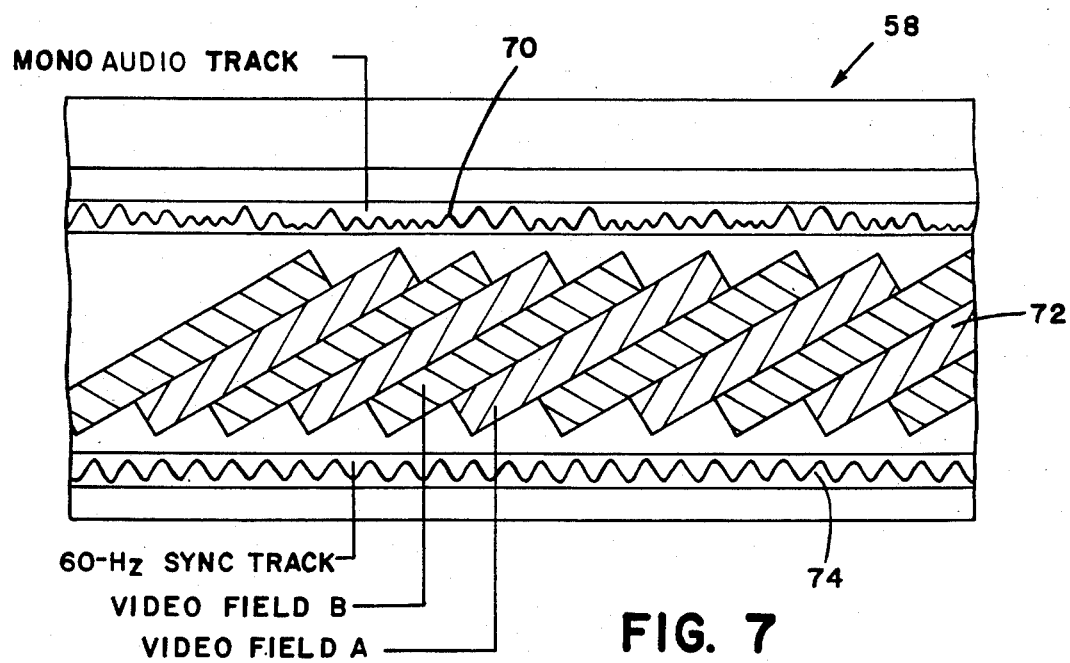
FIG. 7 is a pictorial representation of the track recording format for a stereo Beta format tape.

The video cassette recorder that is illustrated in the preferred implementation of the invention is a high fidelity stereo recorder, model SL-2700 made by the Sony Corporation. The standard format for recording the magnetic tape of the VCR (18) in stereo is more fully shown in FIGS. 4-7. In FIG. 7 it is seen that three types of tracks are recorded on a tape of cassette (19) by processing the video and audio input signals of the VCR (18). Initially, a single longitudinal track (70) is used at the one edge of the tape to record a mono audio track. This mono audio track records that audio information used in the reproducing process for driving a nonstereo monitor or one channel of a stero monitor. At the other edge of the tape, there is included a 60-Hz sync track (74) which provides time base information to the recorder during reproducing. Between the mono audio track (70) and the 60-Hz sync track (74) there are recorded a plurality of oblique video tracks (72).

Figure 5:
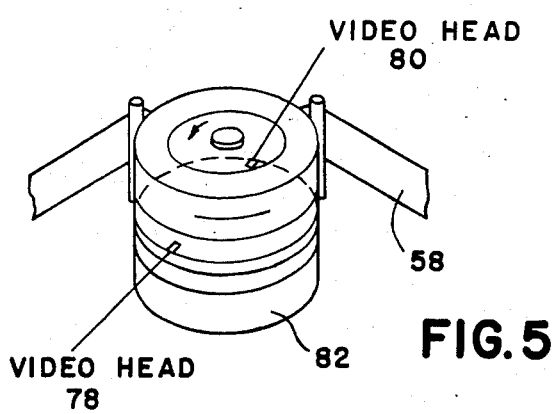
FIG. 5 and FIG. 6 are a pictorial representation of a helical scan recording system for a stereo Beta format tape.
Figure 6:
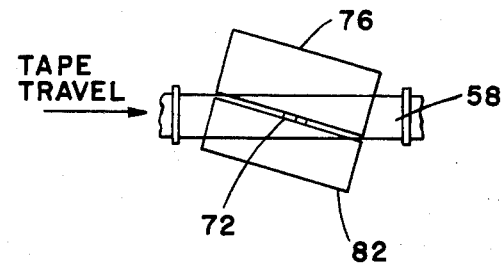

The skew or angle which the video tracks (72) make with the longitudinal tape direction is caused by the head travel of a heliacal scan recording system conventional in the magnetic recorder art. The recorder mounts two of such heads (78) and (80) on a drum (82), as seen in FIG. 5, to provide recording and reproducing functions which alternates between the two. Individual fields of a particular video frame may be recorded, one per track by the alternating heads (78,80) thereby recording a single frame of video information on adjacent tracks. FIG. 7 illustrates this type of formatting where a video field A is recorded by one head adjacent to a corresponding video field B which is recoded by the other head.

In addition, the left and right stereo audio channel information is recorded on the video tracks (72) in this format. The stereo audio information is recorded by the video heads (78,80) at a frequency which is intermediate the luminance carrier and the chrominance carrier of the video signal. This frequency separation is illustrated in FIG. 4 where four frequency modulated stereo carriers (60, 62, 64 and 66) are illustrated. In this format the luminance carrier has been shifted up in frequency by approximately 400 kHz over a normal standard beta video tape format so that it ranges between 3.9 MHz and 5.2 MHz. As is normally the case, the chroma carrier has been down converted to 0.688 kHz. The four stereo carriers (60, 62, 64 and 66) are therefore positioned between the luminance carrier and the chrominance carrier where their side bands produce a frequency null.

The stereo carriers (60, 62, 64 and 66) take advantage of the particular characteristic of the luminance side band where side band energy is not uniformly distributed but is instead concentrated at multiples of the 15.7 kHz. rate at which the horizontal lines of the video signal were scanned. The stereo carriers are interleaved between these side band frequencies to prevent interference. Therefore, the stereo carriers occur at 1.38 MHz. (left channel) and 1.68 MHz (right channel) for the first field "A". For the next track (video field "B" recorded by the opposite head of the helical scan recorder), the stereo carriers are at 1.53 MHz. and 1.83 MHz. In reproducing, the heads (78) and (80) alternately feed a demodulator which is then switched between the appropriate carrier frequencies. What has been described is the standard stereo Beta format for the commercially available video cassette recorder described above.

It is noted that in the stereo Beta format, although a stereo FM recording system is described, the system does not employ the multiplex method used in stereo broadcast. The two channels of audio (left and right) are recorded as separate mono FM signals. This type of recording avoids the noise and distortion problems that arise in multiplex stereo. Further, since there is no multiplex subcarrier there is no need for a 15 kHz bandwidth limit and the frequency response of the recoder extends all the way to 20 kHz for each channel.

The stereo Beta channels are advantageously used by the system for digital data recording because of the wide bandwidth and channel separation which is greater than 60 db. In the present system, the personal computer can record digital data on the left or right stereo audio channels and control the video recorder to produce video and audio information from the video tracks and the mono audio tracks. It is also envisioned that the personal computer can read digital information from either the right or left stereo audio channel and can control the video and audio data from that information. Further, it is well within the scope of the invention to record or read digital information from alternate stero channel or to record and read from one of the stereo tracks while allowing audio information to be recorded on the other stereo channel.

The system makes use of the wide 20 Hz.–20 kHz. bandwidth of the stereo channels of the video cassette recorder (18) to reliably write and read digital data at a high serial rate. The bandwidth of the stereo channels further allows a minimum of encoding and decoding circuitry to be used for high speed data transfer between the VCR (18) and the personal computer. In the preferred example, a common serial data rate of 9,600 baud is used via the communication channel using RS-232 protocol to transfer data to and from the video tape without excessive encoding and decoding circuitry. Since a 9,600 baud data rate is well within the upper frequency limit of 20 kHz, the digital data when it is recorded and reproduced appears to be another audio signal to the VCR and thus is directly adaptable to such a device. Within the VCR (18) the stereo audio signal frequency modulates a carrier (which is a component of the video signal) and thus achieves the recording and reproducing capability. The RS-232 protocol uses a non return to zero (NRZ) byte encoded data format for data transfer.

It is seen that NRZ byte encoded data at a 9,600 baud rate ranges from 10K transitions per second for a byte of alternating ones and zeros down to 2K transitions per second for a byte of identical bits. Thus, an NRZ digital signal can be reliably encoded and decoded by the VCR (18) with good timing accuracy for an excellent approximation of the square wave shape of the digital data. Thus, NRZ data at a 9,600 baud rate can be directly written and read back from the stereo channels of the VCR (18) without the necessity of modulation and demodulation circuitry. It is evident that any digital data rate, within the bandwidth of the VCR (18) which is being used, can advantageously transer data in the system. The 9,600 baud rate was chosen because it is a common data rate used for the illustrated type of serial communication channel protocol of the personal computer.

Figure 8:
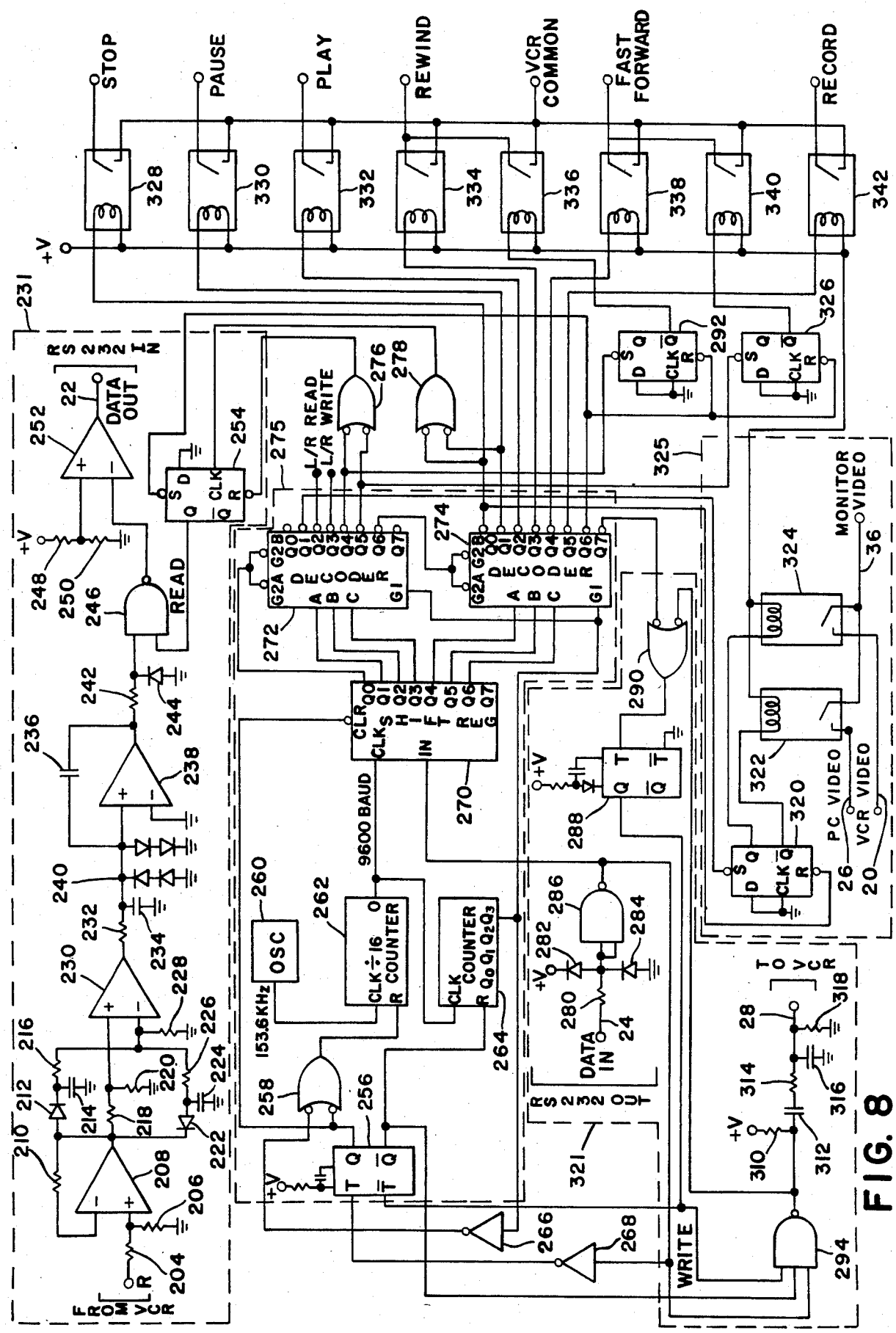
FIG. 8 is a detailed electrical schematic diagram of the interface and control circuit illustrated in FIG. 1.

With respect now to FIG. 8, there is shown a detailed schematic diagram of the interface and control circuit (16) illustrated in FIG. 1. In this description inverted signals will be designated by the symbol * proceeding the signal terminal designation. The interface and control circuit (16) includes a read circuit (231) which receives digital data from the VCR stereo channel outputs (30) and converts it into a readable form by the RS-232 input channel (22) of the personal computer. The read circuit (231) is adapted to read data from either the left or right stereo channel and to output it on input data line (22) under command of the personal computer. Additionally included in the interface and control circuit (16) is a write circuit (321) which is adapted to take digital data from the personal computer via RS-232 output line (24) and convert it into a form which can be written on either the left or right stereo channels (28) of the VCR (18). The write circuit (321) can be enabled to write continuous serial data strings on the video tape stereo channels and the read circuit 231 can be enabled to read continuous data strings.

The read and write circuits are under the control of a command circuit (275) which receives commands from the personal computer via the RS-232 output line (24) and generates the control signals READ and WRITE by decoding the commands. The command circuit (275) also produces control signals to operate the various functions of the VCR (18) by means of a plurality of microminiature relays (328-342).

The switch contacts of microminiature relays (328-342) are all connected in parallel with similarly labled function switches for the VCR (18). The VCR (18) is therefore operable by its manual panel switches or by these auxilliary switches. Preferably, rather than having to modify the panel switches on the VCR, in the implementation shown an infrared remote control module was modified to provide an identical result by paralleling the switching contacts of the relays (328-342) with similar manual function switches of the remote control. It is evident that either a wired remote control, an infrared remote control, or the like could be used. Finally, the command circuit includes a video control ciruit (325) which, under the command of the processor module (12), selects whether composite video from the personal computer or composite video from the VCR (18) will be output on the monitor video line (36).

Normally, the interface and control circuit (16) is monitoring the serial data line (24) from the personal computer and is ready to receive a data byte which can be decoded as a command to the VCR (18), the read circuit (231), the write circuit (321), or the video circuit (325). The interface and control circuit (16) discriminates between command bytes and actual data from the personal computer by switching to a write mode which continues until a data stream comes to an end. When reading data, the control and interface circuit (16) can simultaneously issue a command and receive serial data. The personal computer is thus at all times in control of the tape motion of the VCR (18) and can command read and write data modes as required.

The command bytes are received as normal RS-232 serial bytes and are converted from serial to parallel and thereafter latched and decoded into individual commands. The command circuit (275) performs these functions by receiving the command data bytes via an input circuit consisting of an inverter (286) which has clipping diodes (282, 284) connected at its input and is fed by a input resistor (280). The input circuit receives the +5 V input data from the RS-232 data line (24) and converts them into TTL levels (+0 V–+5 V) for further processing.

The command data bytes are clocked into a shift register (270) by a 9,600 baud clock which is applied to the clock input CLK of the shift register by the output of a counter (262). The 9,600 baud clock is developed by dividing a 153.6 kHz. oscillator signal from oscillator (260) by 16 in the counter (262). A counter (264) counts the clock pulses which drive the shift register (270) and produces a high level output via its Q3 output when eight clock pulses have occurred. By feeding back the Q3 output of the counter (264) through an inverter (266) and an OR gate (258), the counter (262) is held reset after it has generated eight clock pulses. This operation shifts one eight-bit command byte into the shift register (270) where it can be decoded from the register outputs Q0–Q7.

The command byte in the shift register (270) remains static during the set state of a monostable device (256). The monostable device (256) thereafter times out allowing another command to be input. The first transition of the next command byte causes the monostable device (256) to again set via the transmission of the leading edge of the signal to the T input of that device by inverter (268). The setting of the monostable device (256) causes three signals to be generated. Initially, the shift register (270) clear is removed by the positive going edge of the Q output of the device. Additionally, the positive going edge of the Q output of device (256) via the OR gate (258) removes the reset from counter (262) allowing it to produce the clocking signal to the shift register (270). Lastly, the *Q output of the device (256) removes the reset from counter (264) such that it may again count the number of clock signals to the shift register (270).

Figure 13A:
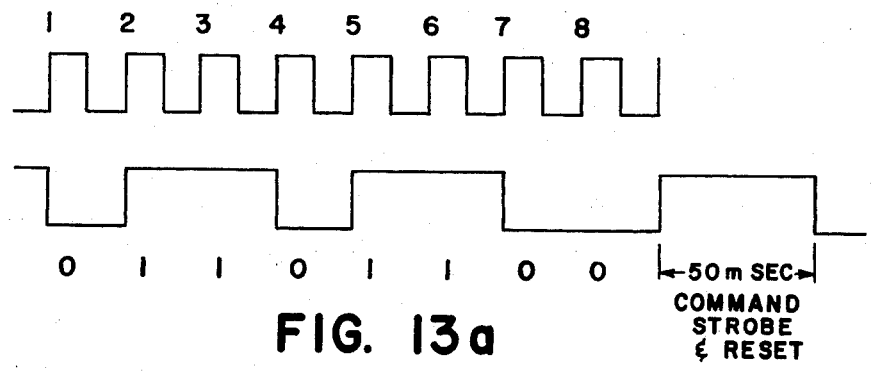
FIGS. 13a and 13b are waveform diagrams illustrating the timing signals for a read and write operation of the interface and control circuitry illustrated in FIG. 8.

The monostable device (256) is continuously retriggered by the incoming command byte data via the inverter (268) so that until the entire command byte is clocked into the register (270) the counters (262, 264) will be enabled. When the entire eight bits of the command byte has been clocked into the register, as detected by the Q3 output of counter (264), the counter (262) is halted by the high level signal applied to its R input via OR gate (258) and inverter (266). Thereafter, the monostable device (256) is allowed to time out resetting the command circuit for another command. At the time out, the high to low transition at the Q output clears register (270) and the low to high transition at the *Q output resets counter (264). The time out period is preferably approximately 48 msec. in the implementation shown. The system thereby allows commands to be given to the interface and control circuit (16) approximately 50 msec. apart. This timing representing the input of a read command is illustrated in FIG. 13a.

The command byte data is decoded from the Q0–Q7 outputs of the shift register (270) by a pair of decoder devices (272, 274) which have their decoding inputs A, B, and C connected to the outputs of the register. The lowest order bit output of the shift register, Q0, is used to enable the decoder device (272) by its connection to the G2A, G2B inputs of that device. Outputs Q1-Q3 are used to decode the first character of the command byte by their connection to the decoder inputs A, B, and C of device (272). Likewise, outputs Q4–Q6 are used to decode the second character of the command byte by their connection to the decoder inputs A, B, and C of device (274). The Q3 output of counter (264) not only latches the outputs of the shift register (270) but also enables the decoders with its connection to the G1 inputs of the devices (272, 274).

The two control characters decoded in devices (272, 274) operate to control the read circuit (231), the write circuit (321), the video circuit (325), and the relays (328-342). The second character decoder device (274) is enabled by the decoder output Q6 of device (272) decoding a binary 110 in the first character position. The low level signal from the Q6 output of decoder (272) is applied to the enabling inputs G2A, G2B of device (274) such that the second character can be decoded. The second character of the command byte is decoded into one of eight outputs Q0–Q7 of the device (274) to provide various command signals. The Q0 output is used to enable relay (328) to close a switch which connects the STOP function of the VCR (18) to common. The output Q1 generates a signal causing relay (330) to produce a PAUSE FUNCTION for the VCR. The output Q2 enables relay (332) thereby causing the VCR to PLAY. The output Q3, in conjunction with relay (334), causes the VCR to REWIND the tape. The output Q4 is used in conjunction with relay (338) to produce a FAST FORWARD operation of the VCR. The RECORD operation of the VCR is enabled by the output of decoder (274) labeled Q5 and by relay (342).

Normally, the commands are generated by the decoders (272, 274) until the run monostable (256) is reset thereby cancelling a former command and preparing for a subsequent command. Other commands can be generated for a longer duration and will last until a command cancelling the desired function is input to the command circuit. For example, relay (336) has an output switch connected in parallel with the switch of REWIND relay (334). The relay (336) is driven from the Q output of a bistable (292). When the bistable (292) is set, the relay (336) will provide a continuous REWIND function until the bistable is reset. The bistable (292) is set in response to the Q4 output of the first character decoder (272). Likewise, a relay (340) has its switch connected in parallel with the switch of the FAST FORWARD relay (338). The relay (340) is actuated by the low level signal on the output *Q of a bistable device (326) which is set by the Q5 output of the first character decoder (272). The bistable devices (292, 326) provide a continuous rewind and continuous fast forward function prior to either reading or recording functions such that searches for positions on the tape can be made in a facile and advantageous manner.

Another system operation that may be latched for an extended period of time is the read function which is controlled by the Q output of bistable device (254). The Q output, termed the READ signal, enables a NAND gate (246) in the read circuit (231) to permit data flow therethrough as will be more fully explained hereinafter. The bistable device (254) is set by the Q6 output of the second character decoder (274). This command to read data further resets the continuous rewind and fast forward flip-flops (292, 326) respectively.

The read data bistable (254) is reset by the continuous fast forward and continuous rewind signals from the Q4 and Q5 outputs, respectively, of the first character decoder (272). The signals are applied to the reset terminal R of the bistable device (254) via the NOR gate (276). The read bistable (254) may further be reset by giving a stop or pause command which causes the Q0 and Q1 outputs of the second character decoder (274) to go low. These signals are communicated to the clock input CLK of the bistable device (254) via OR gate (278). Therefore, to read data from any position on the tape, the VCR (18) would be commanded to a certain position and then a play command would be issued followed by a read command. The play command and the read command could conceivably be given in the same command byte. Thereafter, to take the system out of the read mode either a stop, pause, continuous fast forward, or continuous rewind command would be issued.

Figure 13B:
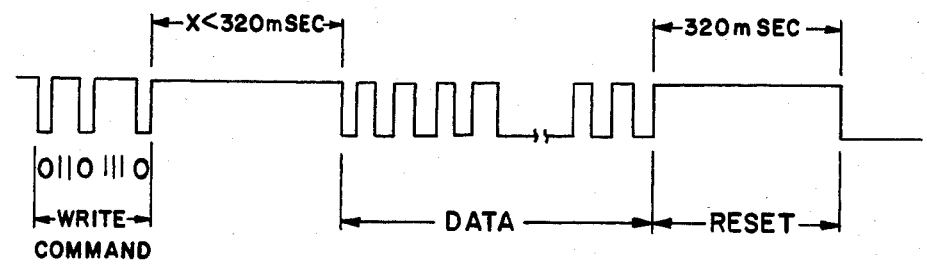

To be able to write data on the cassette tape of the VCR, the second character decoder (274) produces an output on its Q7 output which feeds through OR gate (290) to set a monostable device (288). The monostable device (288) generates a WRITE signal from its Q output to a NAND gate (294). The NAND gate is enabled by this output to transmit data from the input data line 24 through the gate. However, a second enabling signal is also needed to accomplish this and is provided by maintaining the monostable (256) in a reset condition whereby the *Q output of that device enables the NAND gate (294). The data from the output from NAND gate (294) feeds back through OR gate (290) to latch the WRITE monostable (288) in its unstable state as long as data is being transmitted by the personal computer. The personal computer must start writing a data stream before the monostable (288) times out but can continue writing a data stream until done. The monostable device (256), held in a reset state, is prevented from being retriggered by the input data. Once the input data has ceased, the monostable (288) will time out thereby disabling the write data gate (294) and allowing the monostable (256) to release and accept other commands. The time out for monostable (288) is approximately 320 msec. The interface and control circuit (16) thereby differentiates between a command mode and a write data mode with this circuitry. In this manner the personal computer can write extended data strings to the VCR tape and still produce byte commands to the command circuitry. The timing representing the input of a write command and the subsequent writing of data streams is illustrated in FIG. 13b.

The video control circuit (325) determines whether the output to the video monitor line (36) will be from the personal computer video line (26) or the VCR video line (20). The circuitry accomplishes this task by a set of parallel switches which are closed by relays (322, 324). The energization of the relays come from the alternate outputs Q and *Q of a bistable device (320). If the Q output of device (320) is at a high level then relay (324) is operated and VCR video is connected to the monitor. Alternatively if the *Q output of the device (320) is at a low level, then relay (322) is energized and the video monitor is connected to the PC video. The bistable device (320) is set by the output Q1 of the first character decoder (272) and is reset by the stop command from the Q0 output of the second character decoder (274). Thus, while the VCR video can be operated by a command to turn on relay (324), a reset of the device (320) ensures that during stoppage of that VCR (18) the composite video from the PC will be connected to the monitor.

The outputs Q2 and Q3 of the first character decoder (272) are used to develop signals L/R READ and L/R WRITE which when combined with the READ and WRITE signals either select the left or right stereo channels of the VCR. These outputs will be more fully described hereinafter with respect to multichannel read/write circuits.

A table decoding command bytes into VCR functions is illustrated in FIG. 2. An X in a bit or a character position indicates a "don't care" condition. It is readily apparent that this table embodies the operational codes needed for a six function VCR. For recorders with more functions, code assignments can be increased to the number needed by multiplexing more decoders and increasing the length of the shift register. Functuions which are reset by a certain command follow that command in parentheses and a designator R.

The write circuit (321) will now be more fully described where the data input line (24) produces digital data from the personal computer which is fed to one input of the NAND gate (294). When enabled the NAND gate (294) passes data to the right or left stereo channel input of the VCR through a filtering and attenuation network comprising capacitors (312, 316) and resistors (314, 318). The network produces a 0.2 V signal compatable with the stereo channel input and provides a high frequency filter that produces a cut off at 20 kHz such that the data passing through the NAND gate (294) is within the bandwidth of the recorder. The NAND gate (294) feeds the attenuation and filtering network (312-318) with a +5 V-0 V signal from a pull up resistor (310) connected between the output of the gate (294) and a positive voltage source +V. A large coupling capacitor (312) maintains the large bandwidth of the signal while providing a 0 V reference for the output. The attenuation of the network via resistors (314, 318) provides a signal level which is acceptable to the VCR while filter capacitor (316) avoids fast edges which could cause excessive ringing in the input circuitry.

The read circuitry (231) will now be more fully described with respect to the input amplifier (208) which is configured as an inverting buffer amplifier. Digital data from the output of a stereo channel is divided by a voltage divider consisting of resistors (204, 206) before being input to the noninverting input of the amplifier. The gain of the amplifier is adjusted by the value of the resistor (210) connected between the output and inverting input of the amplifier. The buffer amplifier stage amplifies the 0.2 V nominal signal of the stereo channel such that an overall gain of approximately 15 yields a 3 V output signal.

The second stage of the circuit is a midamplitude crossing detector comprising upper and lower peak detectors, an attenuator, and a differential amplifier (230). The attenuator is formed by a divider network of resistors (218, 220) connected between the output of the operational amplifier (208) and the noninverting input of the operational amplifier (230). The upper peak detector comprises a positively poled diode (212) which feeds a capacitor (214) and an input resistor (216). The lower peak detector comprises a diode (222), poled oppositely of diode (212), which feeds a capacitor (224) and an input resistor (226). The upper peak detector and lower peak detector are connected in parallel from the output of the operational amplifier (208) to a shunt resistor (228) which provides a signal input to the inverting input of amplifier (230).

The amplifier (230) operates as a comparator which switches when the input signal on the noninverting input exceeds the bias on the inverting input to provide a square wave signal output. In this manner the circuit measures the moment at which the signal reaches the half amplitude position between the baseline and the peak. This is accomplished by having the upper peak detector capacitor (212) charge to the signal peak and the lower peak detector capacitor discharge to the baseline level. The bias on the inverting input is then the mean of these two levels. Any DC level shift produced by the output of the VCR (18) is thereby filtered out by this stage. Attenuation is applied to the output of the amplifier (208) so as to conform to the voltage limit to the gain of operational amplifier (230).

The third stage of the read circuit is a noise rejection stage that makes use of the large frequency difference between typical noise and the relatively slow digital signal at 9,600 baud. The stage is formed by an RC filter comprising resistor (232) and capacitor (234) feeding a clipping circuit (240) which limits excursion to ±1.4 V. The clipping and filtering is provided so that the delay of the filter will be totally unaffected by the bit pattern. The resulting signal approximates a ramp of constant slope and is squared once again by an operational amplifier (238) that follows. The operational amplifier (238) is referenced to ground at its inverting input and includes capacitive feedback via capacitor (236) which inserts a 10 percent hysteresis and thus protection against noise occurring just at the crossover point. The output from the amplifier (238) is input to the logic NAND gate (246) which has a diode (244) and input resistor (242) for clipping the output of amplifier (238) to a TTL level.

The final stage of the read circuit is a operational amplifier (252) which is connected at is inverting input to the output of the NAND gate (246) and at its noninverting input to the junction of a voltage divider formed by resistors (248, 250). Digital data output from the NAND gate is formed into a +5 V, −5 V square wave by the operational amplifier (252) when the data exceeds and falls below the threshold voltage provided by the divider. The final stage can consist of the operational amplifier (252) driver shown or a conventional RS-232 transmitter such as a 75150 chip made by a number of commercial manufacturers.

Figure 9:
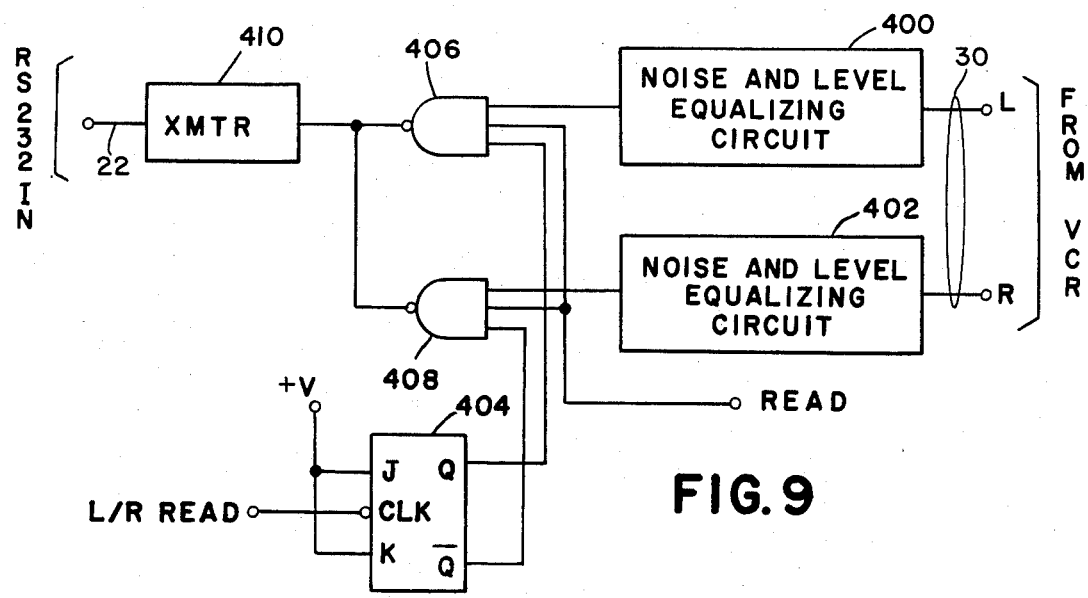
FIG. 9 is a system block diagram of an alternative read circuit for the interface and control circuit illustrated in FIG. 8.
Figure 10:
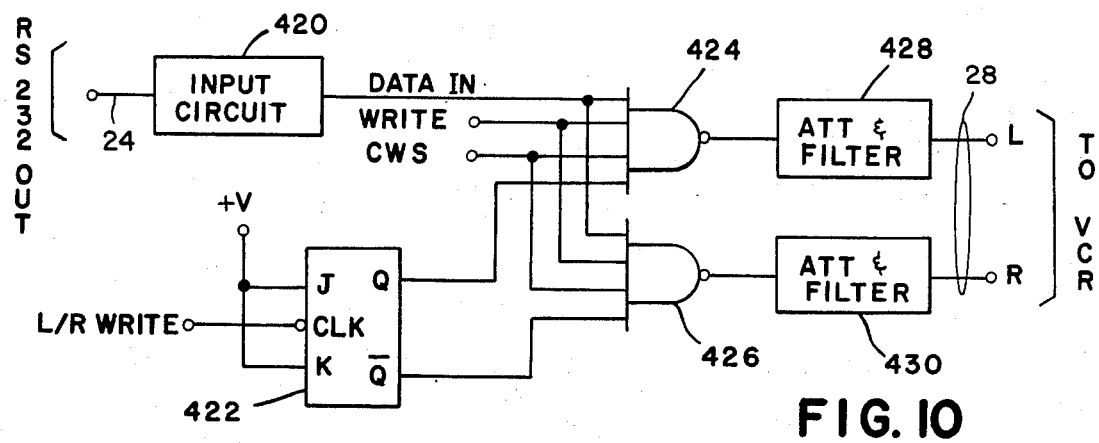
FIG. 10 is a system block diagram of an alternative write circuit for the interface and control circuit illustrated in FIG. 8.

The read and write circuits described with respect to FIG. 8 are capable of reading or writing a single stereo channel. Many times the system described herein will need the capability to read or write more than a single stereo channel. FIG.-9 and FIG. 10 are alternative embodiments for the read and write circuits (231, 321) which are adapted to be used in multichannel applications. FIG. 9 is a multichannel read circuit comprising noise and level equalizing circuitry (400,402) for the left and right stereo channels. These circuits are duplicates of the circuitry of FIG. 8 connected between the stereo output channel and the NAND gate (246) of circuit (231) and provide the same function. The outputs from NAND gate (406,408) are commonly connected to the input of a transmitter 410 whose output communicates with the RS-232 data line 22. An enabling signal READ from the bistable (254) allows data to be passed through the gates (406,408) when the system is in a read mode. The system can choose the channel data which is to be passed by the state of a bistable (404) which alternately enables NAND gates (406,408). The control selects the state of bistable with the signal L/R READ which toggles the bistable when Q2 output of the first character decoder (272) is stobed by a command.

A multichannel write circuit is illustrated in FIG. 10 where a NAND gate (424) and attenuation and filter circuit (428) form a parallel path with a NAND gate (426) and attenuation and filter circuit (430). The inputs to the parallel NAND (424, 426) gates are fed by a common signal including the DATA IN signal from an input circuit (420), the WRITE signal from the control circuit, and the enabling signal CWS from the RUN monostable (256). Depending upon the state of a bistable (422), either one of these channels can pass data from the RS-232 output to a particular VCR stereo channel. The bistable alternately selects one of the NAND gates (424,426) for enablement by being toggled by the signal L/R WRITE. This signal is generated by the Q3 output of the first character decoder (272) when strobed by a command.

Figure 11:
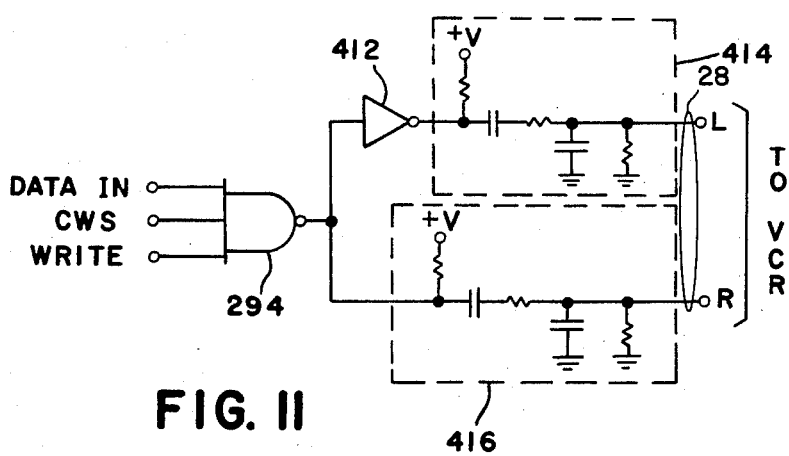
FIG. 11 is a system block diagram of a second alternative read circuit for the interface and control circuit illustrated in FIG. 8.
Figure 12:
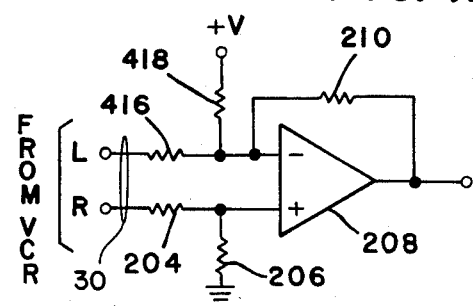
FIG. 12 is a system block diagram of a second alternative write circuit for the interface and control circuit illustrated in FIG. 8.

Another alternative embodiment envisions reading a digital data signal and its inversion from the left and right data channels. This embodiment is illustrated in FIG. 12 where amplifier (208) of the read circuit has been modified by pull up resistor (418) and input resistor (416) to produce a differential signal to the amplifier. Common mode moise rejection is enhanced in this manner. A circuit for writing a digital signal and its inverse on the left and right stereo channels is shown in FIG. 11 where the write circuit has been expanded to a second channel. The only difference between the single and dual channel write circuits in this embodiment is the two filter circuits (414, 416) and an inversion in one of the data signals before being written on the left and right stereo channels.

An overview of the method of producing a teaching tape and a user program will now be more fully disclosed in FIG. 14. Initially, in block A200 the concepts for a tutorial session and the visual information to be transferred to a student is blocked out on a storyboard by a producer. The storyboard is a visual outline of the particular sequences and topics of coverage to be communicated during the teaching session. Once the storyboard has been produced, a menu and question script provides a written description of the interaction between the user program.

Next, a standard master video tape is produced from the storyboard to include a plurality of video segments covering the topics and visual information to be conveyed. The video segments need not be in the order in which the storyboard is programmed or in any logical order at all, they must simply contain all the information which the teacher wishes to convey to the student. An audio segments portion accompanies the corresponding video segment data on the standard master tape.

Timing marks are written on the tape in block A205 to provide indications of the locations of the visual scenes. In block A206, the system will use subsequently described routines to produce scene blocking data to provide a portion of the header (index) for later recording on the teaching tape. After the scenes have been programmed, a user program is produced in block A208 from the script written in block A202 and the indexed scene data. Thereafter, the header portions of the tape are recorded from the data files for the user program and the index in block A209. Finally, copies of the finished teaching tape may be reproduced in block A210 for distribution to training centers having a tutorial system as described in the present application.

Figure 15:
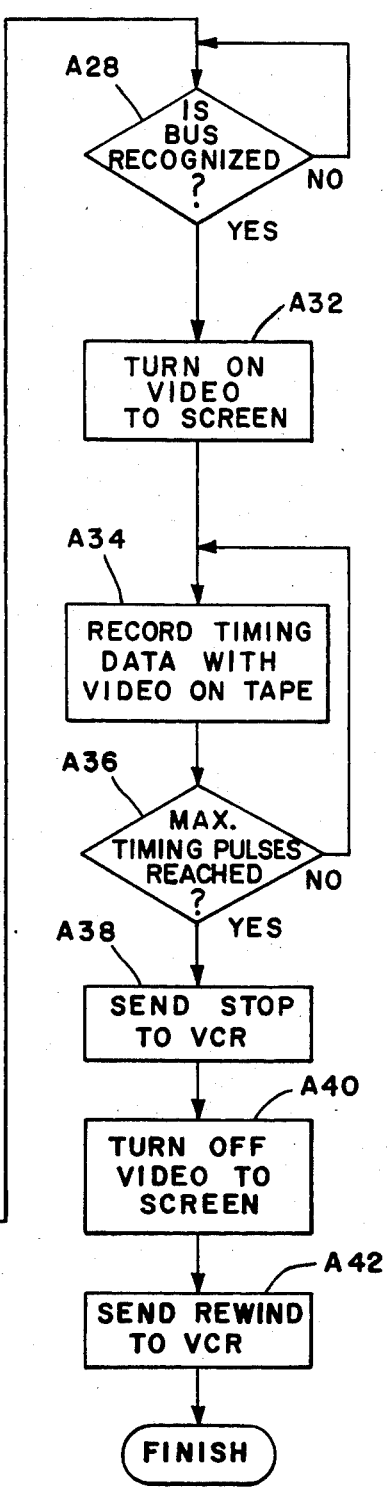
FIG. 15 is a detailed flow chart of the program used to write a user program as called from the routine illustrated in FIG. 14.

A flow chart for the program enabling the operator to generate the user program file will be more fully described with reference to FIG. 15. Starting in block A212 the program displays a message requesting the operator to indicate whether he wants menus and questions in the user program. The program tests the operator response in block A214. If the answer is negative, then the program will save a blank user program file in block A222. However, if the answer is affirmative, then the program sequences to a subroutine in block A216 which allows the programmer to design the menu portion of the program. Next, a subroutine is accessed in block A218 which allows the programmer to design the questions portion of the training program. These design subroutines can be common input/output routines which allow the programmer to type into memory questions and menus in the form of data strings for later use as prompts in the user program. These programs allow the command and branching structure to implemented from the script generated in block A202 (FIG. 14) so as to provide interactive operation of the system by a student. The files for the menu and questions data are then stored for further use in block A220 before the program exits.

The format produced by the system for a teaching tape is better illustrated in FIG. 3 wherein it is shown that the tape is segmented into three major sections. A header section with an index and user program initiates the tape and is followed by a video segment portion containing video and audio data for use by the user program. Following the video segment portion, a program section may be included as an option.

Prior to the header portion is a beginning of tape marker BOT which is recorded as a 1 kHz. audio tone for one second. The beginning of tape marker is recorded on the left stereo channel and provides an indication of where the information on the tape initiates. The BOT marker is the beginning of the tone and the end of the tone is labeled as location 001. Generally, it is preferable to have a fixed length header or index of 120 seconds, but there is no reason why a shorter or longer index could not be provided. On the left stereo channel of the 120 second header at location 110 to location 120 is recorded another 1 kHz. audio tone which is ten seconds in length. This audio tone indicates the start of the video segments and is the begin video segments marker BVS. Recorded on the video tracks of the header is a computer output image containing possible copyright information, the course title, version number, and other pertinent information for a specific video teaching cassette. On the right stereo channel of the header portion after the beginning of tape marker will be recorded the index and user program information for the video segments which follow.

In the video segments portion of the tape on the video tracks are recorded the actual scenes and visual information used by the tutorial system to produce images on the monitor. Further in the audio tracks of the video segments portion are corresponding audio programs which accompany the video segments. On the right stereo channel of the video segment portion is scene marker information containing digital data at the 9,600 baud rate. The scenes are marked with digitally encoded location counter marks that increment at five location marks per second. The scene location marks may also continue throughout the variable length program area to its end.

In the program section may be included digital data for any additional programming needed by the user program. Conceivably, the video tracks of this portion of the tape could further be used to store digital data as a mass memory system for the personal computer. When used in this manner, it is envisioned that the video output of the VCR (18) would be decoded and input to a separate RS-232 communication channel of the personal computer to read back the digital data stored thereon.

The production of a teaching tape in this format is accomplished in three phases or recording operations. An initial master video tape containing the video segments and corresponding monophonic audio programs for the video segments portion is generated using standard studio facilities. The video master also contains the monophonic audio signals on both the left and right stereo channels of the tape which may be over written, depending upon the desired use. The first two minutes (120 second header) of the video tracks is intentionally left blank to provide a place for recording the header data. The beginning of tape mark and the beginning of video segments mark are then recorded on the left channel of the header portion at locations 000 to 001 and at locations 110–120, respectively. The end of the "1 kHz" tone for the beginning of video segment marker indicates an end of the header section portion of the tape and the beginning of the scene video signals and audio information signals on the tape. If desired, another portion of tape is left blank for an optional program section.

This studio master tape with the BOT, and BVS marks is then reproduced with scene timing marks onto a teaching master tape under control of the scene marking program. The scene marking program first rewinds and then records the teaching tape along with the playing studio master thereby recording the BOT and BVS marks in the correct timing sequence. When the ten second 1 kHz. tone of the BVS marker is recognized by the system, the program will begin recording scene marker locations on the right stereo channel with an audio signal containing digital data at a 9,600 bit per second rate. The scenes are marked with a digitally encoded scene location counter that increments at five location points per second in a code which is recognizable to the system. The location counts are recorded to the end of program section.

After completion of recording the location marks by the system, the teaching master tape is used by an operator assigned to program the scene locations. Using another application program, the operator programs the start and stop points of each scene, along with their scene number and other identifiers, on a temporary file of the personal computer system. This scene index information will later be used for the header generation. At the end of the programming session the scene index and header generation program will generate a data file on the disk which contains the scene information and user programming information specific to the training program being constructed.

This file data is then recorded on the teaching master tape using the right stereo channel in the video tracks of the header section. The video tracks of the header section may also record video data output directly from the personal computer during this operation. Further programming in digital form may be recorded on the left stereo channel of the program segment of the tape, and other video data from the personal computer in digital or composite NTSC format can be recorded on the video channels of that segment.

The teaching master (or duplicate copies) are used for tutorial sessions by the students. To start a training session, the teaching tape cassette is loaded into the VCR (18) and the recorder turned on. During an instruction mode of operation, a template program is read from a diskette into the RAM of processor module (12) by the operating system. The template program includes a boot section which is adapted to read the header portion of the video tape and a utilities section which is used to control operation of the VCR (18). The utilities section is used for operation of the VCR functions, searching locations on tape and for reading and writing on tape. The template program is then executed by the operating system as an application program to read the digitally encoded data from the right stereo channel of the header portion of the tape. With this information including the user program and index the system will be able to address the video segments on the tape in the sequence programmed.

Figure 16:
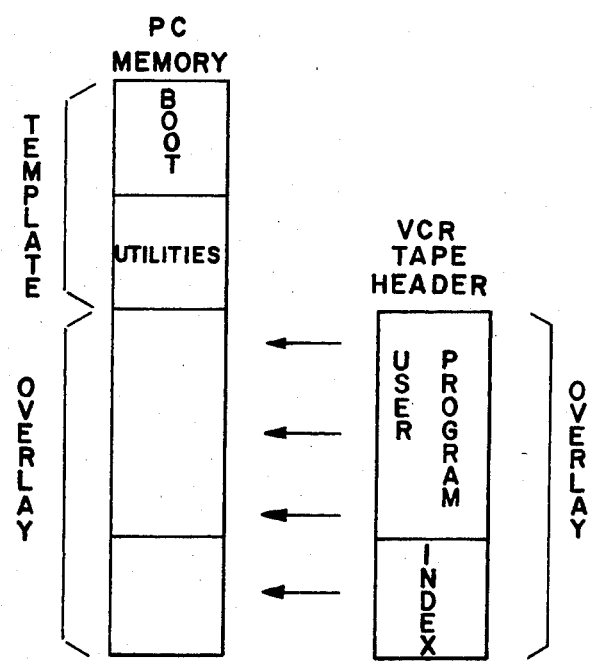
FIG. 16 is a pictorial representation of the memory map of the personal computer and the teaching tape for an overlay process.

In FIG. 16 is illustrated a visual representation of a memory map of the personal computer active memory and the header data of the video tape. It is seen that the user program and index is taken from the video tape header and overlayed into the template program residing in the active memory of the personal computer. After overlaying the user program and index into active memory, the boot routine transfers control to the user program.

The user program then rewinds the tape and commands the VCR (18) to begin operation. The user program commands the VCR (18) to read forward until the ten second 1 kHz. tone is recognized on the left audio track. At the end of the tone (BVS mark), the user program recognizes this as the beginning point of the video segments or scenes and initiates an interactive tutorial session.

The user program displays the video segments in their programmed sequence as modified by responses from the student in the interactive portion of the program. The user program accesses the index for data which indicates the programmed sequence for displaying the video segments. If the video segments are to be played in their recorded order, the index may be left blank. The user program recognizes a blank index as a command to play the video portion from beginning to end.

Figure 17:
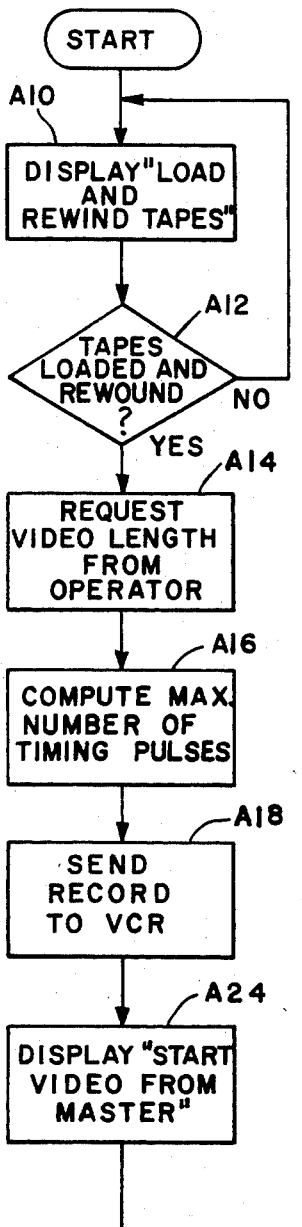
FIG. 17 is a detailed flowchart of a routine for writing timing marks on a video cassette tape as called from the routine illustrated in FIG. 14.

A software flow chart for recording the scene position timing marks described with respect to the making of a training tape will now be more fully explained with respect to FIG. 17. To be at this position in the process, the original studio master has previously been recorded with the video segments and audio portions contained thereon. A training master tape is loaded into a VCR (18) connected as configured in FIG. 1 and the personal computer is loaded from a diskette with the appliction program whose flow chart is illustrated in the present figure. Another VCR loaded with the studio master is connected to the video and audio inputs of the system VCR as by inputs 23 and 25 (FIG. 1).

The operating system then executes the application program where it starts at block A10. The program in that block displays a message to the operator to load and rewind the training and the studio master tapes. When the system determines that the tapes have been loaded and are in the total rewound position in block A12, it transfers control to block A14 where the length of the video segments from the operator is requested. The operator will then input a number indicating the length in minutes of the video segments and any other program section required. After this task is accomplished, the number of timing pulses needed write this duration is computed in block A16 from the number of minutes input by the operator.

After the initialization of the routine has taken place in these blocks, the system sends a record command to the VCR in block A18 and a message to start the studio master tape is then generated in block A24. The system enters a waiting loop in block A28 until the BVS marker is recognized, indicating that the system has performed this operation. The program then progresses to block A32 where the video signal is output to the screen. While the VCR (18) is recording the studio video segments on the training tape, the system is also recording timing marks TM on the tape in block A34 at a sequence of once every 0.2 second. Decisional block A36 determines whether the maximum number of timing pulses have been written and loops back to the recording block A34 if the recording is not finished.

When the tape has been completely written with the timing marks, a stop command is sent to the VCR in block A38, the monitor is turned off in block A40, and the tape is rewound in block A42. At this point the training tape is ready to be used to program scene data locations for the index.

Figure 18:
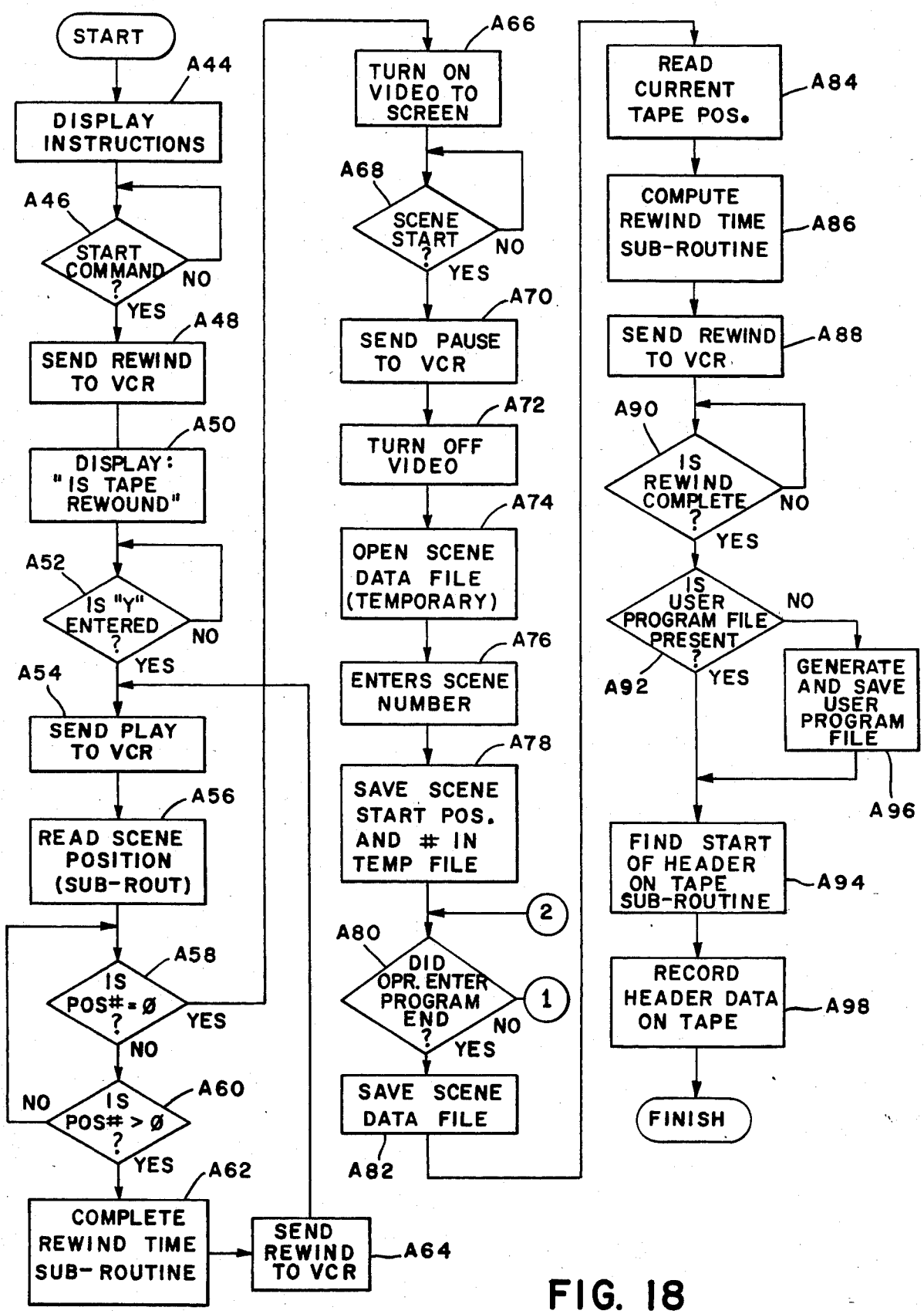

The header generation program will now be more fully described with respect to the detailed flow chart of FIGS. 18 and 19. This routine allows the training program producer to index the scenes as determined by the original story board. The routine generates a data file which contains the information relating a scene number with its start and stop locations as determined from interaction between the producer and the system playing the training tape generated from the initial scene training marker routine. Generally, the program producer starts the video tape and the system allows him to visually know the current position of the tape at any point in time. By knowing the position of the tape and watching the video display of information at those positions, the producer is able to select the beginning and end location number of each scene, as well as a sequence to the program. At the end of the routine, the producer will rewind the tape and then record the index section of the training tape with the information from the data file he has been accumulating. This information is then used by the contemporaneously stored user program to sequence through the video segments in the order in which they were programmed in the index.

The header generation routine initiates in block A44 by displaying the instructions that an operator may send the VCR (18) and system to control the tape. Following the display, the system waits for a start command in block A46 before progressing to block A48, where a rewind command is sent to the VCR (18). Thereafter, in block A50 the system requests an answer to the message, "Is the tape rewound?" When the system receives a correct answer in block A52, it begins the index generation by sending a play command to the VCR. A read scene position subroutine is then executed in block A56 to produce a visual indication of the position of the tape. The position or location number is also stored in a variable for testing against particular constants.

In the decisional block A58 the position number of the tape is tested to determine whether it is at the start of the video segments. If it is not, then decisional block A60 is executed to determine whether the position number is greater than the beginning position of the video segments. If it is, the program progresses to block A62 where a rewind time is computed to bring the tape back to a position before the beginning of the video segments. A rewind command is then generated in block A64 and the tape rewound for the calculated time. The program thereafter sequences back to block A54 where the VCR is commanded to play again. The loop at block A58 and A60 is reentered and the actual position of the tape tested against the beginning position in the video segments until an affirmative answer in block A58 causes a branch of the routine to block A66.

At block A66, the video signal from the VCR is applied to the monitor and a message sent to the producer to determine whether a particular scene has started in block A68. When the scene that the producer has been waiting for begins, he will send a pause command to the VCR in block A70 and turn off video to monitor in block A72. He then receives an indication of the position number indicating the beginning of the first scene number. A data file for recording the scene numbers is opened in block A74, and the initial scene number assigned by the producer and its starting position on the tape, is entered into that file in blocks A76 and A78.

The program thereafter tests to determine whether the producer has entered an end of program indication and, upon an affirmative test result, transfers control to block A82. On a negative response to the test, control is transferred to block A104 (FIG. 19) to finish programming the video segments. In block A104 and block A106, the commands to play the VCR and turn on the video to monitor are generated. The system then proceeds to loop in block A108 and block A110 until either a start of a scene or an end of a scene occurs. This is determined by the producer watching the video monitor and pausing the VCR to display the tape position numbers on the monitor screen.

Since this is an initial pass through the program, and the first scene number and its starting position has already been determined, the next significant marker would be the end of the initial scene and thereafter the program will sequence to block A112. In that block, the operator causes a pause command to be sent to the VCR and the video monitor turned off in block A114. The monitor then displays the scene numbers of the open scenes entered into the file and their starting positions. In block A118, the operator assigns the number of the scene which has just ended and enters its end position number therein in block A120.

The system returns to block A80 where it checks to determine whether the operator has entered a program end indication. If not, the program continues back to the loop, beginning at block A104, at which time the VCR is again commanded to play and the VCR video is displayed on the monitor. At the next scene start, the program transfers control to block A122 where the operator causes the VCR to pause and the video to the monitor to be turned off in block A124. As previously described, the operator assigns a scene number to the particular video segment he is watching in block A126 and thereafter saves the starting possition of that scene and its assigned number in the temporary file with block A128. The operation of assigning numbers to a scene and recording their starting and ending locations continues until the producer completes the entire storyboard. To exit the routine, the producer enters a program end command which is sensed by block A80 (FIG. 18).

A representative file illustrating index information is illustrated in the appendix at lines 9000–9180. In this file there are 18 visual scenes or video segments to be played in the sequence determined by the user program. Scene 1 starts at location 1000 and ends at location 1100; scene 2 starts at location 2400 and ends at location 2500, etc.

At this point, A82 (FIG. 18) the program continues by saving the temporary data file which has been accumulated by programming the scenes onto the disk file. Next, the current tape position is input in block A84 and a rewind time computed in block A86 to determine how long it will take the recorder to rewind from its present position. Next, in block A88, a rewind command is sent to the VCR and a waiting loop is entered in block A90 until the rewind time has elapsed.

The program then requests of the operator whether a user program file is present in block A92. If there is no user program file present, the program sequences to block A96 where this file is generated and saved (FIG. 15). This block consists of a subroutine which, in response to the operator, inputs and stores questions and prompts relating to certain scenes to be displayed in the tutorial information. Once the user program file is generated, or if it is already present, the system positions the tape at the start of the header in block A94. Thereafter, in block A98, the data in the user program file and the index file are recorded in the header section on the right stereo channel in the format shown in FIG. 16.

While the present invention has been illustrated and described in conjunction with the various preferred embodiments, it is to be understood that numerous changes and modifications may be made thereto without departing from the spirit and scope of the present invention as is hereinafter defined in the appended claims.

For example, the video storage means has been illustrated as a video cassette recorder but could just as well be embodied as another type of video storage device having capability of recording video, audio, and digital data. Such devices can include video discs, rigid or non rigid (floppy) magnetic storage media (disc or tape), volatile or non-volatile computer memory (ROM, RAM, EEPROM, EAPROM), or the like.

What is claimed is:

1. A circuit for reading digital data from and for writing digital data to a video cassette tape of a video cassette recorder (VCR) having a plurality of manually operated switches, said circuit comprising:
    means for inputting digital data from a data channel and for outputting digital data to said data channel;
    means for decoding said input data into commands and data, said decoding means generating a write command causing digital data from said data channel to be written on said cassette tape, a read command causing digital data from said cassette tape to be read by said data channel, and operational commands causing functional operation of said VCR:
    said decoding means including:
    a shift register for transforming a serial command into a parallel command word, said shift register inputting said serial command as a plurality of bits from said input data and generating said command word from its outputs;
    means for clocking said shift register with a predetermined number of clocking pulses in order to input a serial command of that number of bits, wherein said clocking means is enabled by the first bit of a command and is disabled by a counter means which counts the number of clocking pulses applied to said shift register;
    a run monostable which is set by the receipt of input data and generates a run signal to enable said clocking means, said run monostable being continuously retriggered by incoming data until an entire command has been received and then timing out, said run monostable generating a halt signal upon timing out disabling the clocking means, clearing said shift register, and resetting said counter means;
    a character decoder for decoding bit positions of said command word into strobe signals on control lines;
    said decoding means generating said read command on one of said control lines, said write command on another of said control lines, and said operational commands on other of said control lines;
    a plurality of relays, each having a coil and switch contacts;
    wherein said control lines generating said operational signals are each coupled to one of said plurality of relays such that each control line drives the coil of a corresponding relay and each relay has its switch contacts connected in parallel across one of said manually operated switches of the VCR;
    means for writing said digital input data on said cassette tape in response to said write command;
    means for reading said digital output data from said cassette tape in response to said read command;
    a read bistable which can be set by the read command and whose output enables said means for reading; and
    means for operating said video cassette recorder in response to an operational command.

2. a circuit as set forth in claim 1 wherein said decoding means generates:
    an operational stop signal on a second control line operating a stop relay and causing the VCR to operate in a stop mode;
    an operational pause signal on a third control line operating a pause relay and causing the VCR to operate in a pause mode;
    an operational rewind signal on a fourth control line operating a rewind relay and causing the VCR to operate in a rewind mode;
    an operational fast forward signal on a fifth control line operating a fast forward relay and causing the VCR to operate in a fast forward mode;
    an operational record signal on a sixth control line operating a record relay and causing the VCR to operate in a record mode.

3. A circuit as set forth in claim 2 which further includes:
    a continuous rewind bistable which can be set by one of said control lines and reset by said read command;
    a continuous rewind relay having switch contacts and a coil; and
    wherein the switch contacts of said continuous rewind relay are paralleled with the switch con acts of the relay driven by the rewind signal, said continuous rewind relay having its coil driven by the output of said continuous rewind bistable.

4. A circuit as set forth in claim 3 which further includes:
    a continuous fast forward bistable which can be set by one of said control lines and reset by said read command;
    a continuous fast forward relay having switch contacts and a coil; and
    wherein the switch contacts of said continuous fast forward relay are paralleled with the switch contacts of the relay driven by the fast forward signal, said continuous fast forward relay having its coil driven by the output of said continuous fast forward bistable.

5. A circuit as set forth in claim 4 wherein:
    said read bistable includes a reset terminal connected to said control lines for the stop, pause, continuous fast forward, and continuous rewind relavs such that said read bistable will be reset in response to operational signals causing the stop, pause, continuous fastforward, or continuous rewind relays to be operated.

6. A circuit as set forth in claim 1 which further includes:
    a write monostable which is triggered by said write command, said write monostable generating an enabling signal when set to said means for writing, and generating a disabling signal to said run monostable device to prevent its retriggering while data is being written, said write monostable being retriggered by the data written and timing out once the data input has stopped.

7. A circuit as set forth in claim 1 wherein said means for reading further includes:

means for reading said digital outppt data from one channel of said cassette tape in response to said read command;

means for reading said digital output data from another channel of said cassette tape in response to a read command; and means for selecting between said one and said another read channel to provide said output data to said data channel.

8. A circuit as set forth in claim 7 wherein said means for selecting includes:

a read channel select bistable having an output and an inverted output which are used to alternately enable said one and said another read channels, said channel select bistable being toggled to change states by a read channel select command from one of said control lines.

9. A circuit as set forth in claim 1 wherein said means for writing further includes:

means for wirting said digital input data to one channel of said cassette tape in response to said write command;

means for writing said digital inpu data to another channel of said cassette tape in responsc to said write command; and means for selecting between said onc and said another write channels to apply said input data from said data channel.

10. A circuit as set forth in claim 9 wherein said write channel selecting means includes:

a write channel select bistable having an output and an inverted output which are used alternately to enable said one and said another write channels, saiJ write channel select bistable being toggled to change states n response to write channel select command from one of said control lines.

11. A circuit as set forth in claim 1 wherein said means for reading further includes:

means for reading said digital output data from one channel of said cassette tape in response to a read command;

means for reading said digital output data from another channel of said cassette tape in response to a read command; and means for differencing the data output from said one channel and said another channel to provide differential input to said data channel.

12. A circuit as set forth in claim 1 wherein said means for writing further includes:

means for writing said digital input data to one channel of said cassette tape in response to a write command;

means for writing said digital input data to another channel of said cassette tape in response to a write command; and means for inverting said digital input data before it is written by one of said means for writing.

* * * * *

UNITED STATES PATENT AND TRADEMARK OFFICE
CERTIFICATE OF CORRECTION

PATENT NO. : 4,689,022  
DATED : August 25, 1987  
INVENTOR(S) : John Peers

Page 1 of 3

It is certified that error appears in the above-identified patent and that said Letters Patent is hereby corrected as shown below:

Face of Patent, Abstract Line 14, change "storyboard" to --story board--.

Column 3, Line 13, change "meaterial" to --material--.
Column 3, Line 46, change "beta" to --Beta--.
Column 4, Line 12, change "," (comma) to --;--.
Column 4, Line 38, change "flow chart" to --flowchart--.
Column 4, Line 41, change "flow chart" to --flowchart--.
Column 6, Line 65, change "stero" to --stereo--.
Column 7, Line 5, change "heliacal" to --helical--.
Column 7, Line 15, change "recoded" to --recorded--.
Column 7, Line 26, change "beta" to --Beta--.
Column 7, Line 59, change "recoder" to --recorder--.
Column 8, Line 6, change "stero" to --stereo--.
Column 8, Line 43, change "transer" to --transfer--.
Column 8, Line 46, after "channel" insert --and--.
Column 9, Line 11, change "labled" to --labeled--.
Column 9, Line 22, change "ciruit" to --circuit--.
Column 12, Line 55, change "Functuions" to --Functions--.
Column 12, Line 66, change "compatable" to --compatible--.
Column 13, Line 61, change "excursion" to --excursions--.
Column 14, Line 6, change "a" to --an--.

UNITED STATES PATENT AND TRADEMARK OFFICE
CERTIFICATE OF CORRECTION

PATENT NO. : 4,689,022

DATED : August 25, 1987

INVENTOR(S) : John Peers

It is certified that error appears in the above-identified patent and that said Letters Patent is hereby corrected as shown below:

Column 14, Line 7, change "is" to --its--.

Column 14, Line 41, change "stobed" to --strobed--.

Column 14, Line 46, change "NAND (424,426) gates" to --NAND gates (424,426)--.

Column 14, Line 64, change "moise" to --noise--.

Column 15, Line 9, change "storyboard" to --story board--.

Column 15, Line 10, change "storyboard" to --story board--.

Column 15, Lines 12-13, change "story-board" to --story board--.

Column 15, Line 17, change "storyboard" to --story board--.

Column 15, Line 20, change "storyboard" to --story board--.

Column 15, Line 57, after "to" insert --be--.

Column 16, Line 32, change "segment" to --segments--.

Column 16, Line 64, change "segment" to --segments--.

Column 18, Line 27, change "appliction" to --application--.

Column 18, Line 43, after "needed" insert --to--.

Column 20, Line 32, change "possition" to --position--.

Column 20, Lines 36-37, change "story-board" to --story board--.

Column 22, Line 6, change "a" to --A--.

Column 22, Line 32, change "con acts" to --contacts--.

UNITED STATES PATENT AND TRADEMARK OFFICE
CERTIFICATE OF CORRECTION

PATENT NO. : 4,689,022  Page 3 of 3

DATED : August 25, 1987

INVENTOR(S) : John Peers

It is certified that error appears in the above-identified patent and that said Letters Patent is hereby corrected as shown below:

Column 22, Line 52, change "relavs" to --relays--.

Column 22, Line 55, change "fastforward" to --fast forward--.

Column 23, Line 1, change "outppt" to --output--.

Column 23, Line 20, change "wirting" to --writing--.

Column 23, Line 23, change "inpu" to --input--.

Column 23, Line 24, change "responsc" to --response--.

Column 23, Line 26, change "onc" to --one--.

Column 24, Line 6, change "saiJ" to --said--.

Column 24, Line 7, change "n" to --in--.

Signed and Sealed this

Second Day of February, 1988

*Attest:*

DONALD J. QUIGG

*Attesting Officer*   *Commissioner of Patents and Trademarks*